US012269586B2

(12) United States Patent
Benedict et al.

(10) Patent No.: US 12,269,586 B2
(45) Date of Patent: Apr. 8, 2025

(54) HOVER-CAPABLE AIRCRAFT

(71) Applicant: The Texas A&M University System, College Station, TX (US)

(72) Inventors: Moble Benedict, College Station, TX (US); David Coleman, Bryan, TX (US); Atanu Halder, College Station, TX (US); Bochan Lee, College Station, TX (US); Andrew Riha, Bryan, TX (US); Farid Saemi, Houston, TX (US); Carl Runco, College Station, TX (US); Vishaal Subramanian, College Station, TX (US); Eric Greenwood, Newport News, VA (US); Vinod Lakshminarayan, Sunnyvale, CA (US)

(73) Assignee: The Texas A&M University System, College Station, TX (US)

( * ) Notice: Subject to any disclaimer, the term of this patent is extended or adjusted under 35 U.S.C. 154(b) by 933 days.

(21) Appl. No.: 17/252,502

(22) PCT Filed: Jun. 14, 2019

(86) PCT No.: PCT/US2019/037341
§ 371 (c)(1),
(2) Date: Dec. 15, 2020

(87) PCT Pub. No.: WO2019/241725
PCT Pub. Date: Dec. 19, 2019

(65) Prior Publication Data
US 2021/0253232 A1 Aug. 19, 2021

Related U.S. Application Data

(60) Provisional application No. 62/685,323, filed on Jun. 15, 2018.

(51) Int. Cl.
*B64C 27/68* (2006.01)
*B60L 15/20* (2006.01)
(Continued)

(52) U.S. Cl.
CPC .............. *B64C 27/68* (2013.01); *B60L 15/20* (2013.01); *B60L 50/60* (2019.02); *B64C 27/10* (2013.01);
(Continued)

(58) Field of Classification Search
CPC .... B64C 27/605; B64C 27/467; B64C 27/463
See application file for complete search history.

(56) References Cited

U.S. PATENT DOCUMENTS 3,065,933 A * 11/1962 Williams .............. B64C 27/467
244/17.11
3,467,197 A * 9/1969 Drees .................... B64C 27/463
416/228

(Continued)

FOREIGN PATENT DOCUMENTS

EP     1557354 A1 * 7/2005 .......... B64C 27/467
JP     2015-520697 A   7/2015

OTHER PUBLICATIONS

International Search Report and Written Opinion dated Oct. 10, 2019 for Application No. PCT/US2019/037341.

*Primary Examiner* — Philip J Bonzell
*Assistant Examiner* — Michael B. Kreiner
(74) *Attorney, Agent, or Firm* — Conley Rose, P.C.

(57) ABSTRACT

A hover-capable aircraft includes a body including a tubular strut, a first rotor assembly rotatably coupled to the body and positioned about the strut, wherein the first rotor assembly includes a first plurality of circumferentially-spaced blades, a first actuation assembly including a first plurality of electronically controlled actuators coupled to a first swash- (Continued)

plate and configured to control the movement of the first swashplate relative to the body, and a control system coupled to the body and configured to control the first plurality of actuators, wherein the control system includes a cable extending through a passage formed in the tubular strut and in signal communication with the first plurality of actuators.

17 Claims, 10 Drawing Sheets

(51) Int. Cl.
| | | |
|---|---|---|
| *B60L 50/60* | (2019.01) | |
| *B64C 27/10* | (2023.01) | |
| *B64C 27/467* | (2006.01) | |
| *B64C 27/605* | (2006.01) | |
| *B64D 17/80* | (2006.01) | |
| *B64D 27/24* | (2024.01) | |
| *B64D 31/00* | (2024.01) | |

(52) U.S. Cl.
CPC ......... *B64C 27/467* (2013.01); *B64C 27/605* (2013.01); *B64D 17/80* (2013.01); *B64D 27/24* (2013.01); *B64D 31/00* (2013.01); *B60L 2200/10* (2013.01)

(56) References Cited

U.S. PATENT DOCUMENTS

| | | | | |
|---|---|---|---|---|
| 4,077,741 | A * | 3/1978 | Lowson | B64C 27/463 416/228 |
| 4,168,939 | A * | 9/1979 | Schmitz | B64C 27/463 415/119 |
| RE34,207 | E * | 3/1993 | Nelson | B64C 11/18 416/DIG. 2 |
| 5,879,131 | A * | 3/1999 | Arlton | B64C 27/467 416/223 R |
| 6,000,911 | A * | 12/1999 | Toulmay | B64C 27/463 416/223 R |
| 6,116,857 | A * | 9/2000 | Splettstoesser | B64C 27/467 416/228 |
| 6,231,308 | B1 * | 5/2001 | Kondo | B64C 27/463 416/235 |
| 6,749,401 | B2 * | 6/2004 | Vanmoor | B64C 11/18 244/45 R |
| 7,118,340 | B2 * | 10/2006 | D'Anna | B64C 27/22 244/17.23 |
| 7,331,765 | B2 * | 2/2008 | Falchero | B64C 27/467 416/228 |
| 8,096,779 | B2 * | 1/2012 | Rochegude | B64C 27/473 416/226 |
| 8,128,376 | B2 * | 3/2012 | Karem | B64C 27/467 416/228 |
| 8,142,158 | B2 * | 3/2012 | Schmaling | B64C 27/605 416/159 |
| 8,152,465 | B2 * | 4/2012 | Jaenker | B64C 27/463 416/240 |
| 8,167,233 | B2 * | 5/2012 | Brody | B64C 27/10 244/17.21 |
| 8,596,569 | B2 * | 12/2013 | Cole | B64C 27/82 244/58 |
| 8,979,495 | B2 * | 3/2015 | D'Anna | B64C 27/10 416/114 |
| 9,061,758 | B2 * | 6/2015 | Schimke | B64C 27/467 |
| 9,302,769 | B2 * | 4/2016 | Certain | B64C 27/82 |
| 9,434,471 | B2 * | 9/2016 | Arlton | B64C 27/14 |
| 9,718,541 | B2 * | 8/2017 | Darrow, Jr. | B64C 27/605 |
| 10,167,079 | B2 * | 1/2019 | Weiner | F16F 15/02 |
| 10,220,943 | B2 * | 3/2019 | Leusink | B64C 27/467 |
| 10,414,490 | B2 * | 9/2019 | Leusink | B64C 27/473 |
| 10,604,245 | B2 * | 3/2020 | Pantalone | B64U 20/20 |
| 11,155,336 | B2 * | 10/2021 | Courtier | B29B 11/16 |
| 11,214,364 | B2 * | 1/2022 | Sugiura | B64C 27/473 |
| 2007/0128037 | A1 | 6/2007 | Schmaling et al. | |
| 2011/0163199 | A1 * | 7/2011 | Cardozo | B64C 27/10 244/17.23 |
| 2015/0028597 | A1 | 1/2015 | Eller et al. | |
| 2017/0036758 | A1 * | 2/2017 | Nussenblatt | B64C 27/001 |
| 2017/0283047 | A1 * | 10/2017 | Weiner | B64D 39/00 |
| 2018/0127085 | A1 * | 5/2018 | Churchill | B64C 11/18 |
| 2019/0136868 | A1 * | 5/2019 | Churchill | F04D 29/181 |

* cited by examiner

HOVER-CAPABLE AIRCRAFT

CROSS-REFERENCE TO RELATED APPLICATIONS

This application is a 35 U.S.C. § 371 national stage application of PCT/US2019/037341 filed Jun. 14, 2019, and entitled "Hover-Capable Aircraft" which claims benefit of U.S. provisional patent application Ser. No. 62/685,323 filed Jun. 15, 2018, and entitled "Efficient Compact Quiet Hover-Capable Personal Air Vehicle," both of which are hereby incorporated herein by reference in their entirety.

STATEMENT REGARDING FEDERALLY SPONSORED RESEARCH OR DEVELOPMENT

The invention described herein was made in part by an employee of the United States Government and may be manufactured and used by or for the Government of the United States of America for governmental purposes without the payment of any royalties thereon or therefor.

BACKGROUND

Hover-capable, vertical take-off and landing (VTOL) capable passenger aircraft are used to transport passengers and cargo without requiring the use of a runway. VTOL passenger aircraft may comprise quad-copter and other multi-rotor configurations. VTOL passenger aircraft comprise both fixed-wing aircraft and helicopters and other aircraft with powered rotors. Additionally, VTOL passenger aircraft may be electrically powered or powered by an internal combustion engine. In at least some applications, the multi-rotor configurations of conventional VTOL passenger aircraft suffer from low efficiency and excessive size and noise during operation, minimizing the practical applicability of these configurations. Additionally, at least some conventional VTOL passenger aircraft provide a limited field of view to the pilot, reducing the flight experience and increasing the difficulty of piloting the aircraft. Further, at least some conventional, rotor-powered VTOL passenger aircraft rely on mechanical linkages between the pilot's controls to the swashplates configured for controlling the actuation of the rotors, increasing the mechanical complexity and weight of the aircraft as well as the difficulty in piloting the aircraft.

BRIEF SUMMARY OF THE DISCLOSURE

An embodiment of a hover-capable aircraft comprises a body comprising a tubular strut, a first rotor assembly rotatably coupled to the body and positioned about the strut, wherein the first rotor assembly includes a first plurality of circumferentially-spaced blades, a first actuation assembly comprising a first plurality of electronically controlled actuators coupled to a first swashplate and configured to control the movement of the first swashplate relative to the body, and a control system coupled to the body and configured to control the first plurality of actuators, wherein the control system comprises a cable extending through a passage formed in the tubular strut and in signal communication with the first plurality of actuators. In some embodiments, the aircraft further comprises a battery and an electric motor configured to power the rotation of the first rotor assembly. In some embodiments, the first rotor assembly has an outer diameter and wherein the outer diameter of the first rotor assembly is less than 10 feet. In certain embodiments, the aircraft further comprises a fail-safe parachute coupled to the body and configured to deploy in response to loss of power or pilot actuation. In certain embodiments, the aircraft further comprises a second rotor assembly rotatably coupled to the body and positioned about the tubular strut, wherein the second rotor assembly includes a second plurality of circumferentially-spaced blades, a first swashplate coupled to the first plurality of blades of the first rotor assembly and a second swashplate coupled to the second plurality of blades of the second rotor assembly, and a second plurality of electronically controlled actuators coupled to the second swashplate and configured to control the movement of the second swashplate relative to the body. In some embodiments, the control system is configured to independently control the first plurality of actuators and the second plurality of actuators. In some embodiments, each blade of the first plurality of blades comprises a forward swept section and a rearward swept section. In certain embodiments, the body comprises a portion configured to support a pilot and that is rotationally locked to the tubular strut, and wherein the first rotor assembly is configured to rotate relative to the tubular strut.

An embodiment of a hover-capable aircraft comprises a body, a first rotor assembly rotatably coupled to the body, wherein the first rotor assembly includes a first plurality of circumferentially-spaced blades, a second rotor assembly rotatably coupled to the body, wherein the second rotor assembly includes a second plurality of circumferentially-spaced blades, a first actuation assembly comprising a first plurality of electronically controlled actuators coupled to a first swashplate and configured to control the movement of the first swashplate relative to the body, a second actuation assembly comprising a second plurality of electronically controlled actuators coupled to a second swashplate and configured to control the movement of the second swashplate relative to the body, and a control system coupled to the body and configured to independently control the first plurality of actuators and the second plurality of actuators. In some embodiments, the control system is configured to communicate a first plurality of control signals to the first plurality of actuators and to communicate a second plurality of control signals to the second plurality of actuators. In some embodiments, the first plurality of control signals comprise a first plurality of setpoint blade angles for the first plurality of blades and the second plurality of control signals comprise a second plurality of setpoint blade angles for the second plurality of blades. In certain embodiments, the control system is configured to execute a feedback control mechanism comprising a proportional-derivative controller, an inner loop feedback provided by an autopilot of the control system, and an outer loop feedback provided by a controls interface operated by a pilot of the aircraft. In certain embodiments, each blade of the first plurality of blades and the second plurality of blades comprises a forward swept section and a rearward swept section. In some embodiments, the body comprises a tubular strut and the control system comprises a cable extending through a passage formed in the tubular strut and in signal communication with the first plurality of actuators and the second plurality of actuators. In some embodiments, the aircraft further comprises a first motor configured to power the rotation of the first rotor assembly, wherein the control system comprises a hovering flight mode configured to hold the first motor at a first revolutions per minute (RPM) and a forward flight mode configured to hold the first motor at a second RPM that is greater than the first RPM.

An embodiment of a hover-capable aircraft comprises a body, a first rotor assembly rotatably coupled to the body, wherein the first rotor assembly includes a first plurality of circumferentially-spaced blades, and a second rotor assembly rotatably coupled to the body, wherein the second rotor assembly includes a second plurality of circumferentially-spaced blades, wherein each blade of at least one of the first plurality of blades and the second plurality of blades comprises a forward swept section and a rearward swept section. In some embodiments, each blade of the first plurality of blades and the second plurality of blades comprises a location of sweep reversal positioned between the forward swept section and the rearward swept section, and the forward swept section of each blade of the first plurality of blades and the second plurality of blades has a greater length than the rearward swept section. In some embodiments, the forward swept section of each blade of the first plurality of blades and the second plurality of blades has a central axis that is angled from 3 degrees to 7 degrees from a central axis of the blade in a first angular direction, and the rearward swept section of each blade of the first plurality of blades and the second plurality of blades has a central axis that is angled from 18 degrees to 22 degrees from the central axis of the blade in a second angular direction opposite the first angular direction. In certain embodiments, the aircraft further comprises a first actuation assembly comprising a first plurality of electronically controlled actuators coupled to an outer swashplate and an inner swashplate positioned in the outer swashplate, and wherein the first plurality of actuators are configured to control the movement of the first swashplate relative to the body. In certain embodiments, the inner swashplate and the outer swashplate are coupled to a cylindrical strut of the body, the outer swashplate comprises a rotating swashplate that is rotationally locked to the first plurality of blades, and the inner swashplate comprises a nonrotating swashplate configured to rotate relative to the outer swashplate about a central axis of the strut. In some embodiments, the aircraft further comprises a spherical bearing positioned radially between the inner swashplate and the strut. In some embodiments, the aircraft further comprises a control system coupled to the body and configured to independently control the first plurality of actuators and the second plurality of actuators.

BRIEF DESCRIPTION OF THE DRAWINGS

For a detailed description of exemplary embodiments of the invention, reference will now be made to the accompanying drawings in which.

DETAILED DESCRIPTION OF THE DISCLOSED EMBODIMENTS

Figure 1:
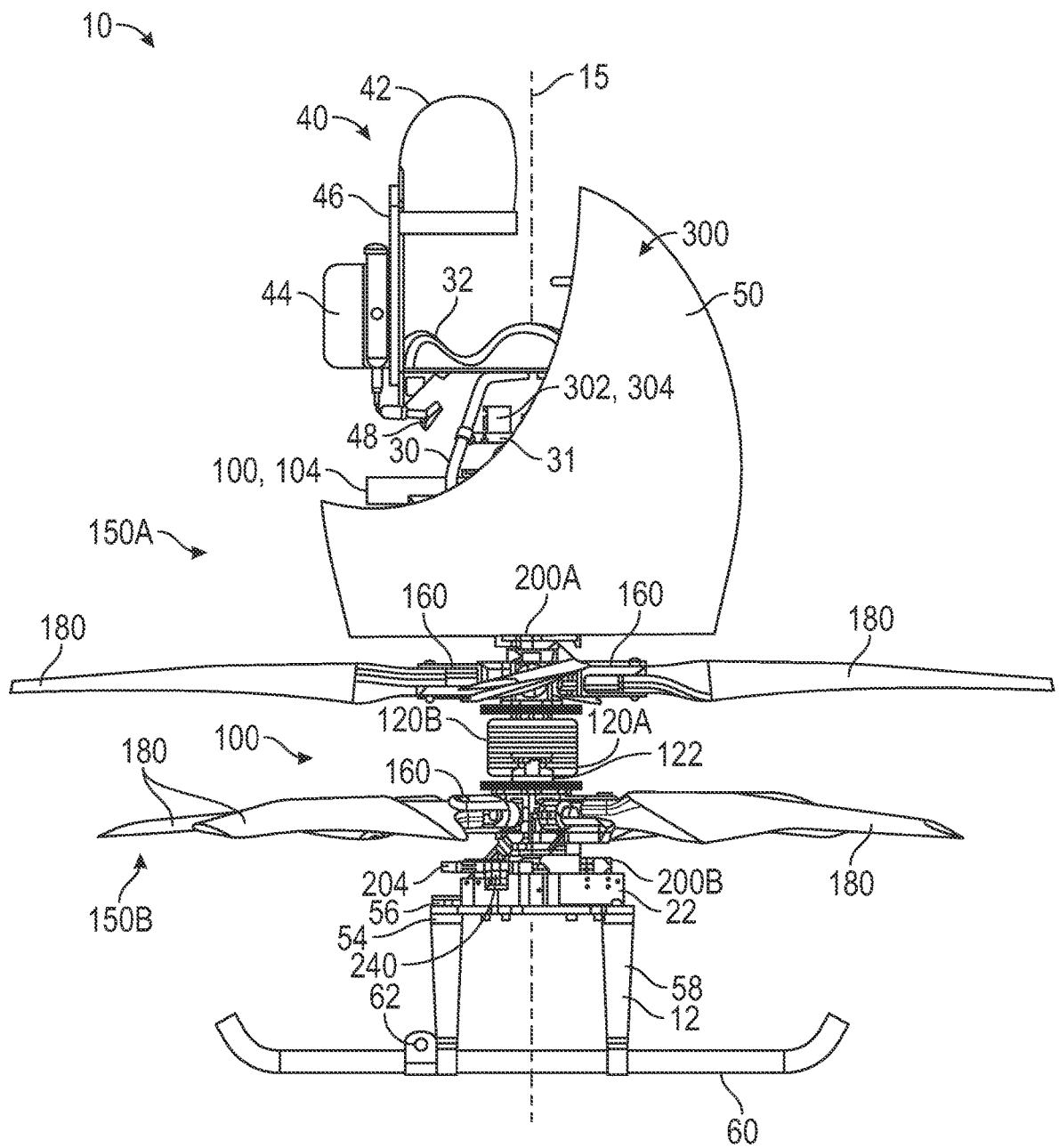
FIG. 1 is side view of an embodiment of a hover-capable air vehicle in accordance with principles disclosed herein.
Figure 2:
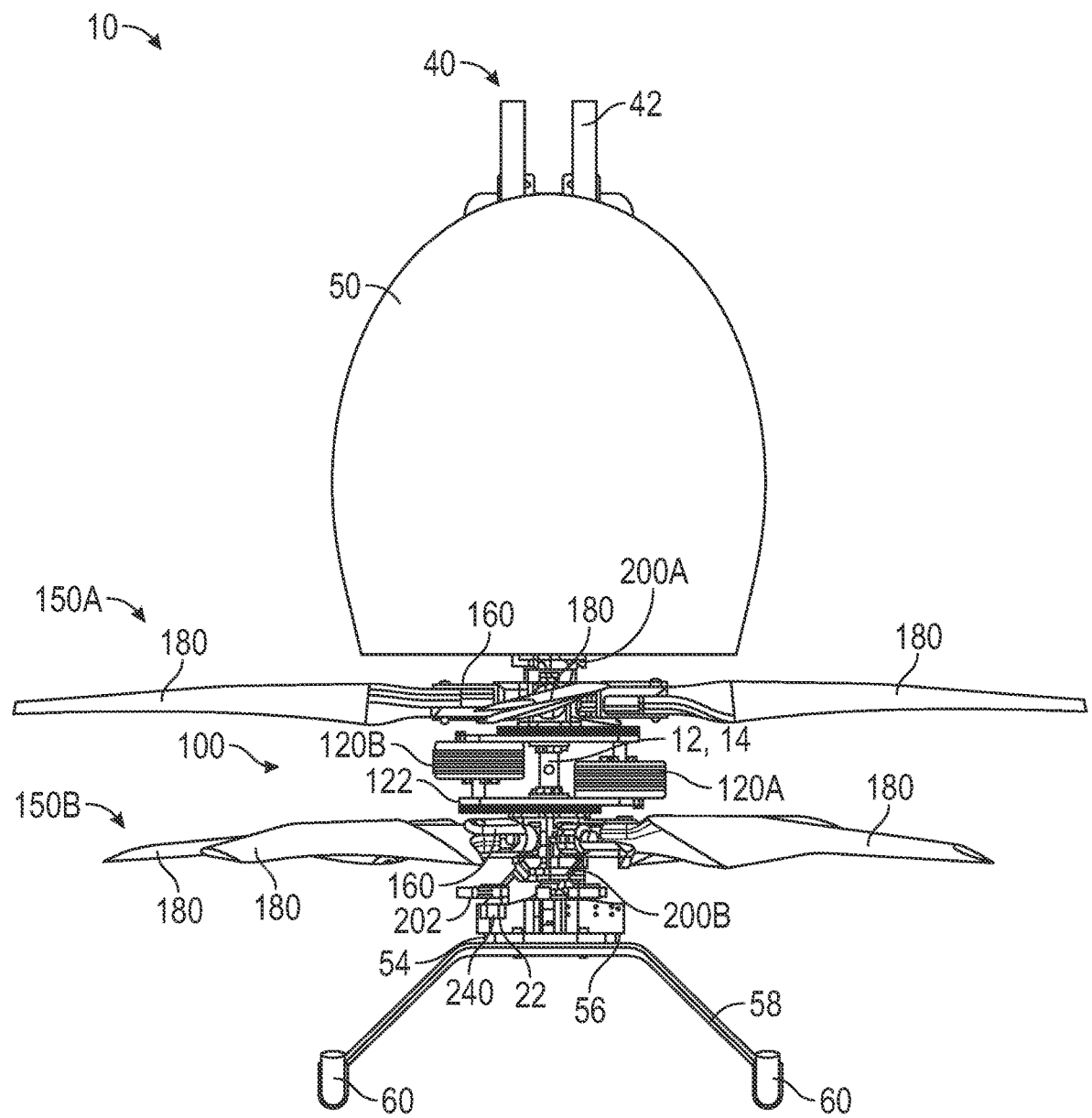
FIG. 2 is a front view of the air vehicle of FIG. 1.
Figure 3:
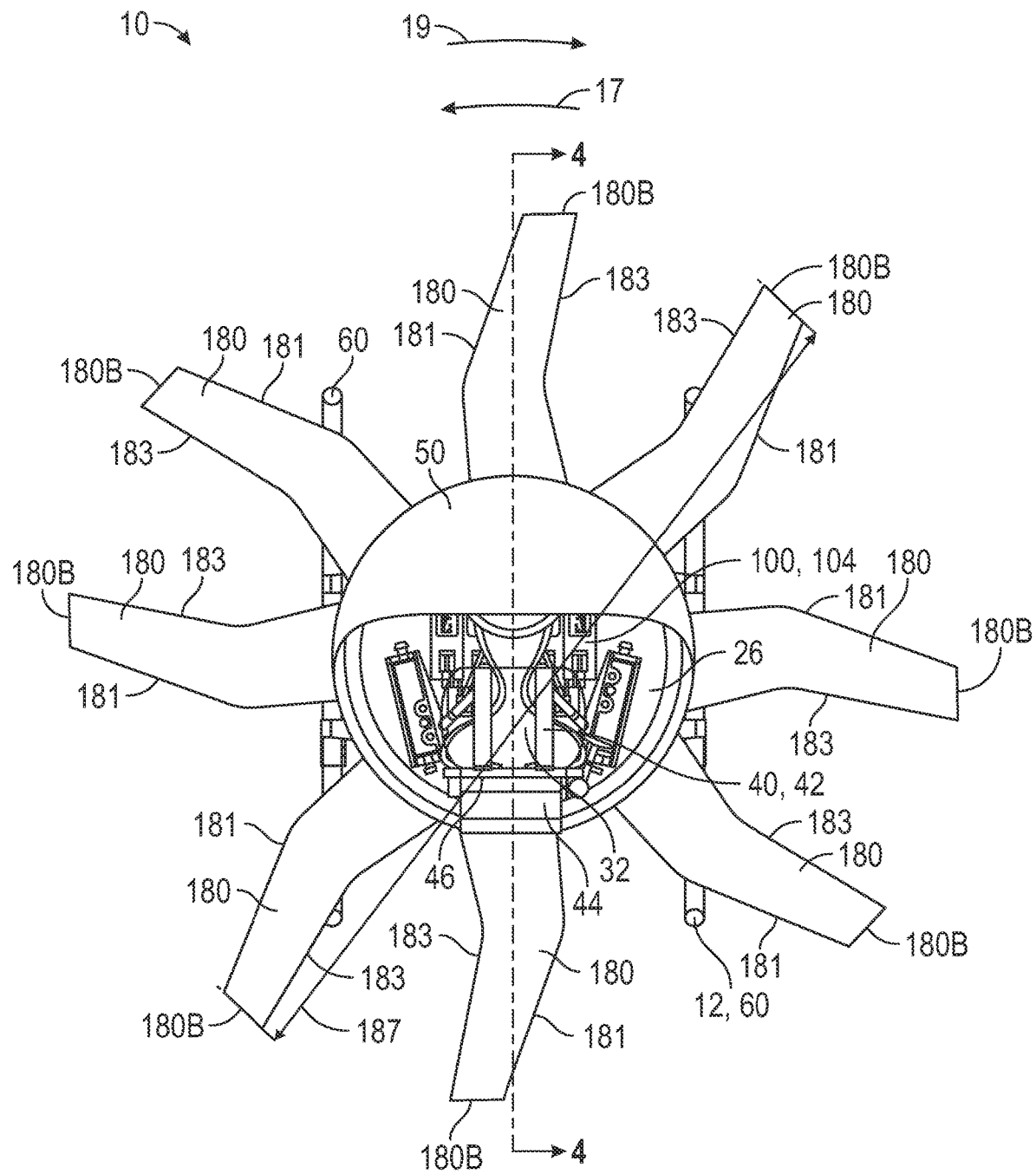
FIG. 3 is a top view of the air vehicle of FIG. 1.
Figure 4:
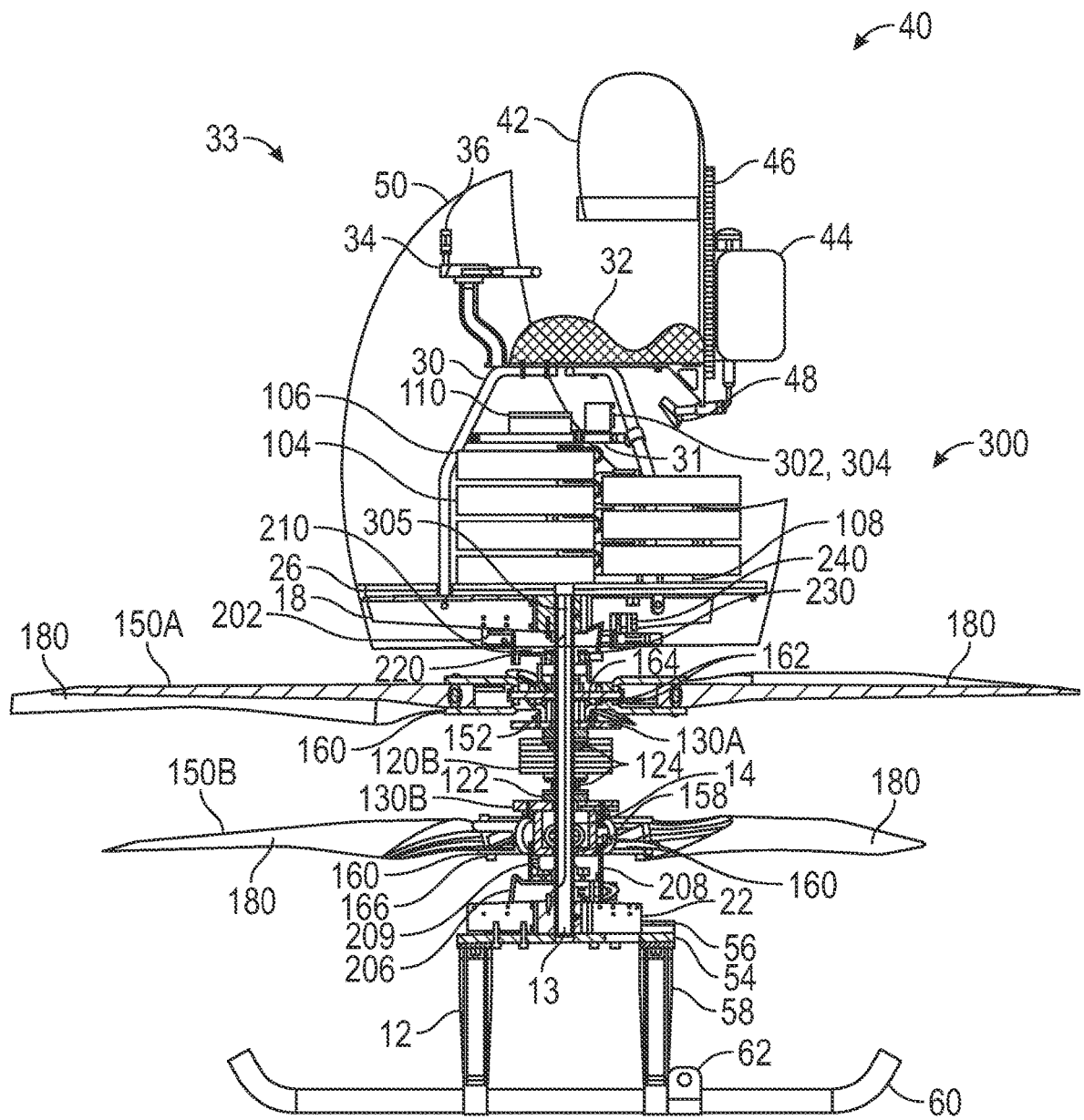
FIG. 4 is a cross-sectional view along line 4-4 of FIG. 3 of the air vehicle of FIG. 1.
Figure 5:
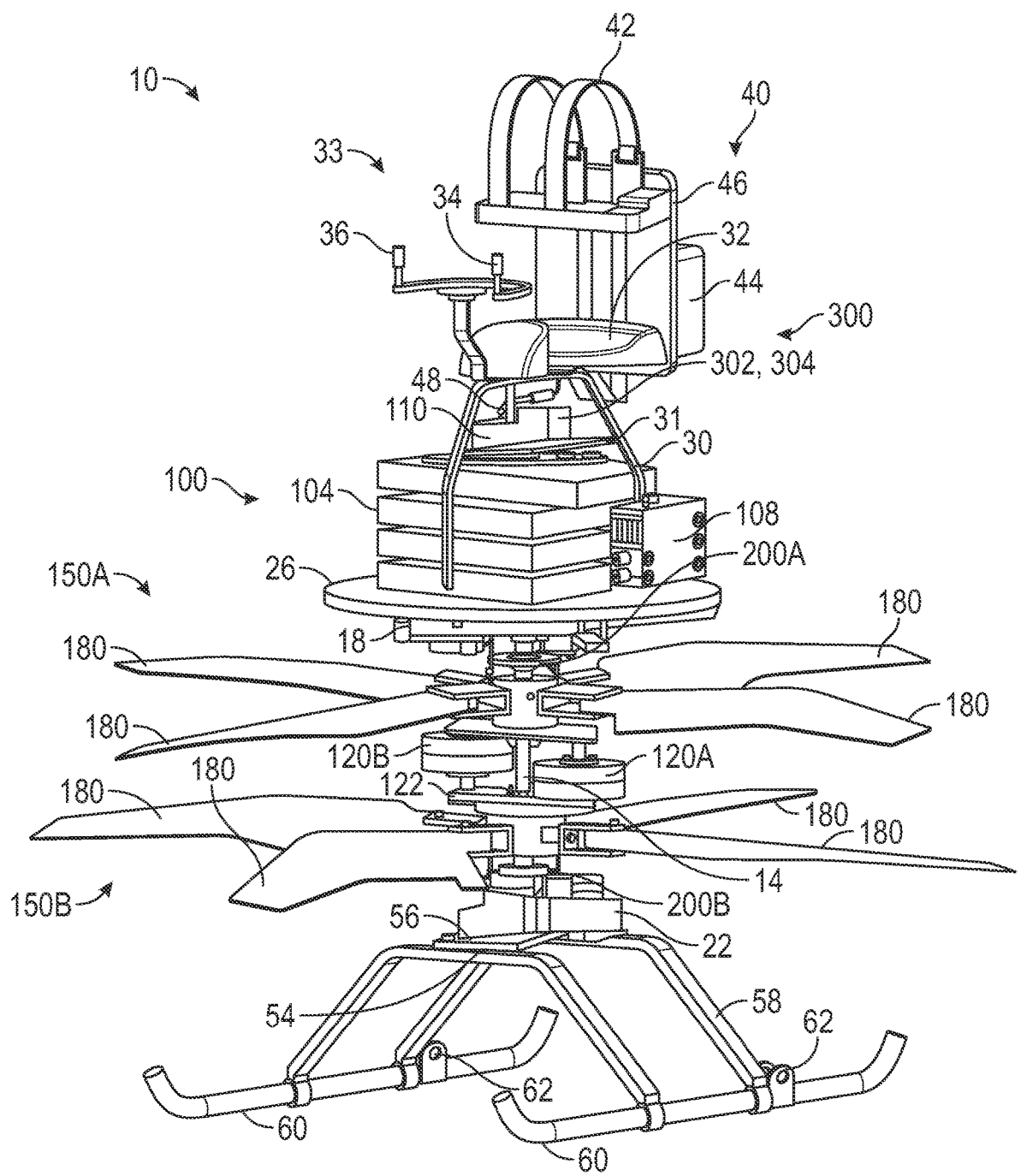
FIG. 5 is a perspective view of the air vehicle of FIG. 1.
Figure 6:
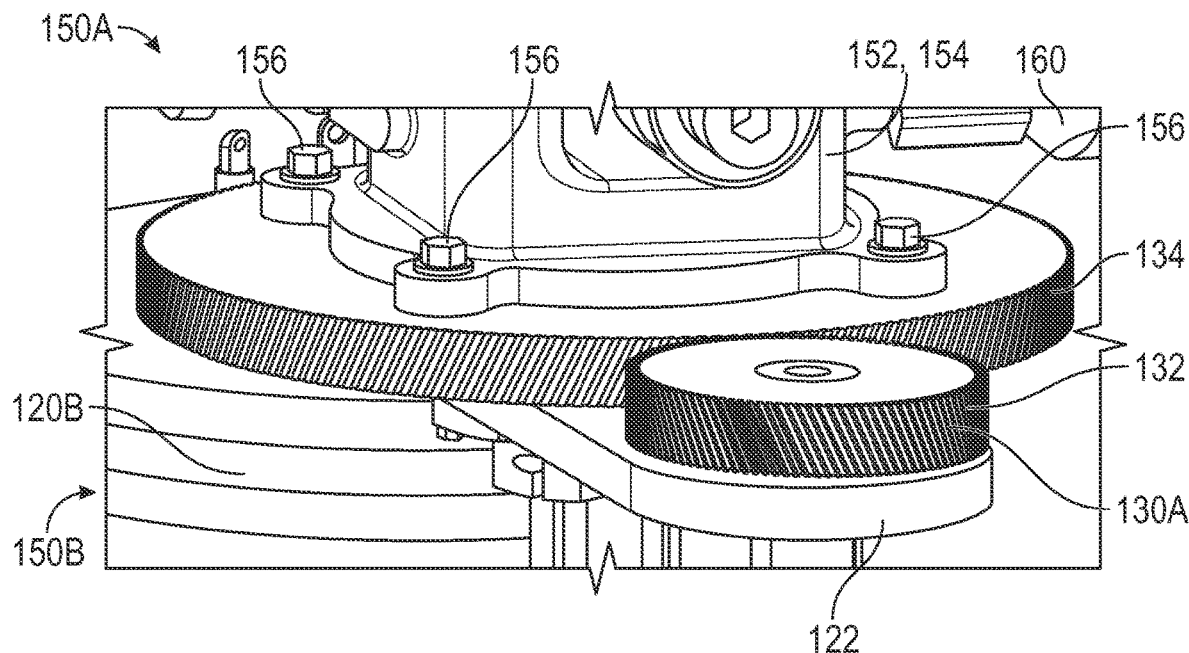
FIG. 6 is a partial perspective view of an embodiment of a gear train of the air vehicle of FIG. 1 in accordance with principles disclosed herein.
Figure 7:
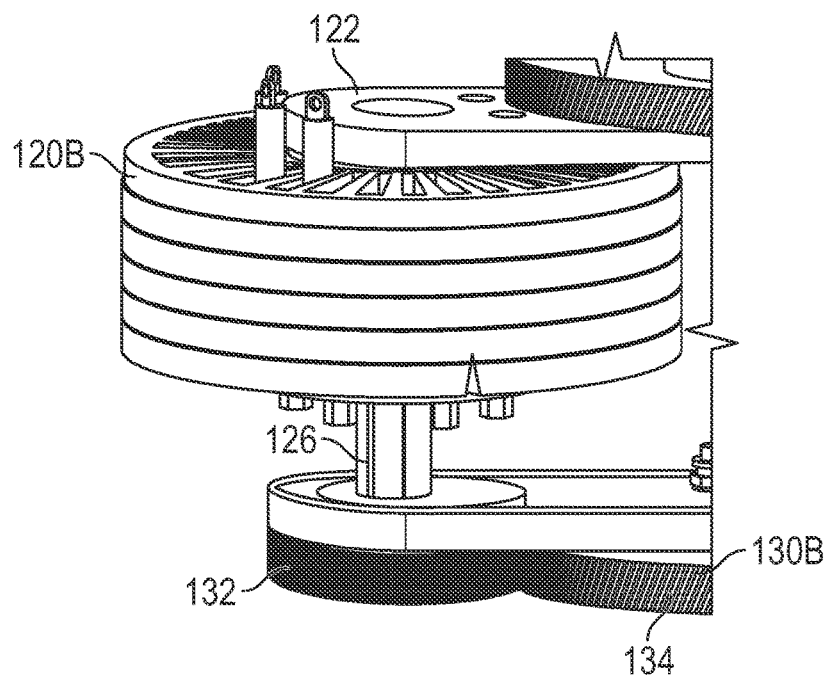
FIG. 7 is a partial perspective view of an embodiment of a motor of the air vehicle of FIG. 1 in accordance with principles disclosed herein.
Figure 8:
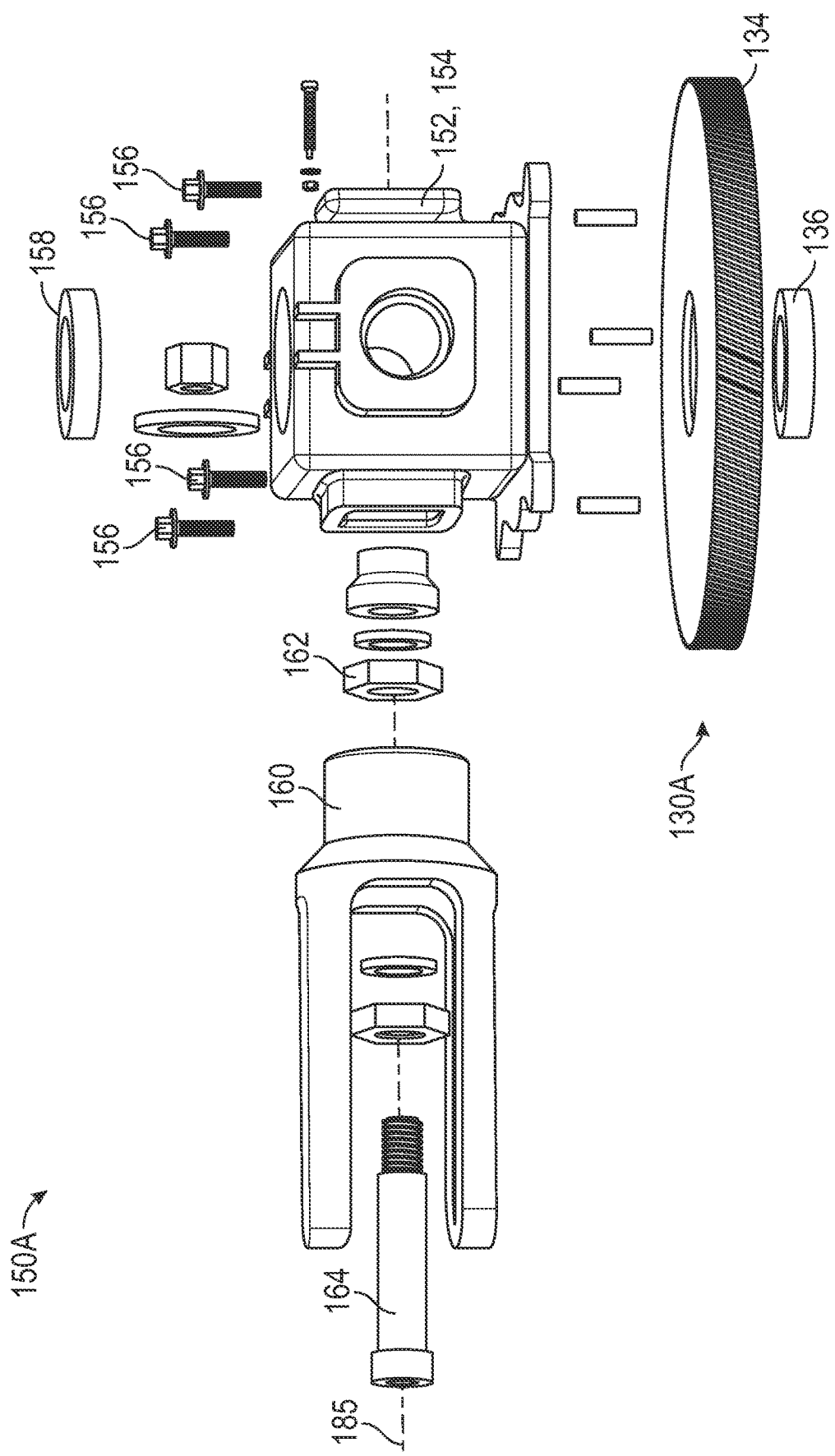
FIG. 8 is an exploded view of an embodiment of a hub assembly of the air vehicle of FIG. 1 in accordance with principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Referring to FIGS. 1-10, an embodiment of a hover-capable, vertical take-off and landing (VTOL) aircraft or air vehicle 10 is shown. Air vehicle 10 is capable of both sustained hovering for vertical take-offs and landings, and forward flight for transporting passengers and/or cargo. Air vehicle 10 has a central or longitudinal axis 15 and generally comprises a body or support structure 12, a powertrain 100 structurally supported by the support structure 12, and an avionics system 300 also structurally supported by the support structure 12. As will be described further herein, support structure 12, powertrain 100, and avionics system 300 are configured to maximize efficiency and the flying experience for the pilot of air vehicle 10 while minimizing the noise produced by air vehicle 10 during operation. In this embodiment, air vehicle 10 has a weight of approximately 450-500 pounds excluding payload, a maximum range of approximately 30-35 miles, a maximum speed of approximately 83-88 knots, and a take-off noise of 70 decibels (dBA) at fifty feet from the air vehicle 10; however, in other embodiments, the weight and performance specifications of air vehicle 10 may vary.

In the embodiment of FIGS. 1-10, the support structure 12 of air vehicle 10 generally includes a lower portion or generally cylindrical or tubular strut 14, a first or upper support arm 18 coupled to a first or upper end of strut 14, and a second or lower support arm 22 coupled to a second or lower end of strut 14. In some embodiments, support structure 12 comprises aluminum, steel, and carbon fiber components. Strut 14 of support structure 12 extends along a central or longitudinal axis which is coaxial with central axis 15 of air vehicle 10. In this embodiment, air vehicle 10 is operated by a pilot supported by the support structure 12; however, in other embodiments, air vehicle 10 may not include a pilot and may instead be operated remotely or operate autonomously. Upper support arm 18 and strut 14 provide structural support for the pilot, powertrain 100, and avionics system 300. As shown particularly in FIG. 4, in this embodiment, support structure 12 additionally includes a floorboard 26 positioned on an upper surface of the upper support arm 18. In this embodiment, support structure 12 includes an upper portion or generally tubular cockpit support frame 30 which extends vertically from the floorboard 26 and supports the pilot of air vehicle 10. A pilot seat 32 and a controls interface 33 are each coupled or mounted to the cockpit support frame 30.

As will be described further herein, the pilot of air vehicle 10 may control the operation and pilot vehicle 10 through the controls interface 33. In this embodiment, controls interface 33 of air vehicle 10 includes a yaw yoke 34 and a cyclic stick 36 each controllable by the pilot of personal are vehicle 10; however, in other embodiments, the pilot operated controls of controls interface 33 may vary. In this embodiment, air vehicle 10 includes a pilot safety system 40 supported by the cockpit support frame 30 that includes a safety harness 42 and a safety parachute 44. Safety harness 42 ensures that the pilot remains in the pilot seat 32 during flight while parachute 44 is configured to provide a controlled, safe descent of air vehicle 10 during flight in the event that powertrain 100 and/or avionics system 300 of vehicle 10 cease to function as intended. Parachute 44 is mounted to a parachute blast board 46 that protects the pilot of air vehicle 10 from the blast of parachute 44 when it is actuated by the pilot. Additionally, pilot safety system 40 includes a parachute handle 48 conveniently positioned proximal pilot seat 32 for actuating or opening the safety parachute 44.

In this embodiment, air vehicle 10 includes a cowling 50 extending vertically from floorboard 26. Cowling 50 is configured to protect components of powertrain 100 from the surrounding environment while also minimizing drag of air vehicle 10 during forward flight. Additionally, cowling 50 is configured to permit a substantially unobstructed field of view for the pilot of air vehicle 10 during flight, thereby maximizing the flight experience for the pilot during the operation of air vehicle 10.

The support structure 12 of air vehicle 10 additionally includes a base plate 52 and accompanying adapter 54 coupled to a lower surface of the lower support arm 22. In this embodiment, a landing gear frame 58 extends from the base plate 54 to a landing gear or ski 60 positioned at a lower terminal end of air vehicle 10. Landing ski 60 is configured to physically support the weight of air vehicle 10 when vehicle 10 is positioned on the ground. Landing ski includes an eye or connector 62 for connecting with one or more wheels for rollably transporting air vehicle 10 on the ground.

Although in this embodiment air vehicle 10 includes landing ski 60 for landing vehicle 10, in other embodiments, air vehicle 10 may include a wheeled landing gear. In some embodiments, the wheeled landing gear may be independently suspended via one or more springs and shock absorption members positioned between the landing gear and the lower support arm 22 of support structure 12.

Powertrain 100 of air vehicle 10 provides thrust sufficient for hovering and providing forward flight for vehicle 10. In this embodiment, powertrain 100 generally includes a power supply system 102, a pair of electric motors 120A, 120B, a pair of rotor assemblies 150A, 150B, and a pair of actuator assemblies 200A, 200B. Power supply system 102 provides power to motors 120A, 120B. Rotor assemblies 150A, 150B are powered by electric motors 120A, 120B, respectively, and are rotatably coupled to the strut 14 of support structure 12. Particularly, motors 120A, 120B are configured to rotate rotor assemblies 150A, 150B at a desired rotational rate or revolutions per minute (RPM) about central axis 15 of air vehicle 10. Actuator assemblies 200A, 200B are configured to control the attitude of rotor assemblies 150A, 150B such that the pilot of air vehicle 10 may move between hovering and forward flight as well as control the trajectory of air vehicle 10 during forward flight.

In this embodiment, first motor 120A is configured to rotate the upper rotor assembly 150A in a first rotational direction 17 (e.g., counterclockwise) (shown in FIG. 3) and second motor 120B is configured to rotate lower rotor assembly 150B in a second rotational direction 19 (e.g., clockwise) (shown in FIG. 3) opposite the first rotational direction. Thus, upper rotor assembly 150A rotates contra lower rotor assembly 150B. Additionally, each rotor assembly 150A, 150B rotates relative to the stationary strut 14 of support structure 12, where rotor assemblies 150A, 150B each surround strut 14.

In this embodiment, power supply system 102 of air vehicle 10 generally includes a plurality of battery cells 104 positioned on the floorboard 26 of support structure 12. Additionally, power supply system 102 includes a battery connector 106 and a motor controller 108 electrically connected between the battery cells 104 and the pair of motors 120A, 120B. In this embodiment, battery cells 104 are configured to output approximately 20 kilowatt hours (kWh); however, in other embodiments, the energy output of battery cells 104 may vary. Motor controller 108 comprises a motor inverter and a RPM governor to hold the RPM constant for each motor 120A, 120B. Additionally, motor controller 108 is configured to interface with an autopilot or controller of avionics system 300 for regulating RPM and torque outputted from motors 120A, 120B. Power supply system 102 additionally includes a battery management system 110 positioned on an electronics support frame 31 of the cockpit support frame 30 of support structure 12. Battery management system 110 is conveniently located proximate pilot seat 32 and is configured to permit the pilot of air vehicle 10 to monitor the performance of battery cells 104, including the amount of battery life remaining in battery cells 104. Additionally, battery management system 110 includes an interface for charging the battery cells 104 of power supply system 102.

In this embodiment, each motor 120A, 120B comprises an alternating current (AC) axial flux permanent-magnet synchronous motor configured to output approximately 32 kilowatts (KW). In at least some applications, the axial-flux motor outputs a greater amount of power per weight than radial-flux motors. However, in other embodiments, the configuration of motors 120A, 120B may vary. Additionally, while in this embodiment air vehicle 10 comprises a pair of electric motors 120A, 120B, in other embodiments, rotor assemblies 150A, 150B may be powered by other types of motors, including an internal combustion engine or a turboshaft engine. Motors 120A, 120B are each coupled to and physically supported by support structure 12 via a motor frame 122 mounted that is mounted to strut 14 via a pair of shaft collars 124 (shown in FIG. 4). Each motor 120A, 120B includes an output shaft 126 extending vertically therefrom and rotatable by the motor 120A, 120B at a desired RPM about a longitudinal or central axis of the output shaft 126 that is parallel with, but radially spaced from, central axis 15 of air vehicle 10.

In this embodiment, powertrain 100 of air vehicle 10 includes a pair of gear trains 130A, 130B. A first gear train 130A is mechanically coupled between first motor 120A and upper rotor assembly 150A while second gear train 130B is mechanically coupled between second motor 120B and lower rotor assembly 150B. In this embodiment, each gear train 130A, 130B comprises a helical pinion gear 132 enmeshed with a helical drive gear 134. Pinion gear 132 of each gear train 130A, 130B is coupled to a terminal end of the output shaft 126 of one of the motors 120A, 120B and is configured to rotate about the central axis of the output shaft 126 to which the pinion gear 132 is coupled. Drive gear 134 of each gear train 130A, 130B is rotatably coupled to the strut 14 of support structure 12 via a drive bearing 136 positioned radially between the drive gear 134 and strut 14. In this configuration, drive gears 136 are configured to rotate relative strut 14 about the central axis 15 of air vehicle 10. In this embodiment, each gear train 130A, 130B is configured to provide approximately a 4:1 gear reduction; however, in other embodiments, the gear ratio provided by each gear train 130A, 130B may vary. In some embodiments, instead of helical gears, the powertrain 100 of air vehicle 10 may include belts, chains, or other mechanisms for transmitting rotational power from motors 120A, 120B to the rotor assemblies 150A, 150B. In still other embodiments, powertrain 100 may comprise an internal combustion engine connected to a transmission for rotating rotor assemblies 150A, 150B in opposite rotational directions.

Each rotor assembly 150A, 150B of the powertrain 100 of air vehicle 10 generally includes a plurality of circumferentially spaced rotor blades 180 rotatably coupled to the strut 14 of support structure 12 via a centrally positioned rotor hub assembly 152. As shown particularly in FIG. 8, in this embodiment, each hub assembly 152 includes a rotor hub housing 154 and a plurality of fasteners 156 for coupling or affixing the hub housing 154 to the drive gear 134 of one of the gear trains 130A, 130B. Thus, the hub housing 154 of upper rotor assembly 150A rotates in concert with the drive gear 134 of the first drive train 130A while the hub housing 154 of lower rotor assembly 150B rotates in concert with the drive gear 134 of the second drive train 130B. Additionally, each hub assembly 152 includes a hub bearing 158 positioned radially between the hub housing 154 of the hub assembly 152 and strut 14 of support structure 12 to permit relative rotation between the hub assembly 152 and the strut 14.

Additionally, each rotor assembly 150A, 150B comprises a plurality of circumferentially spaced blade grips 160, where each blade grip 160 is coupled between one of the rotor blades 180 and one of the hub assemblies 152 of rotor assemblies 150A, 150B. Each blade grip 160 extends radially outwards from the central axis 15 of air vehicle 10 along an elongate or central axis 185 of the blade to which the blade grip 160 is attached. In this embodiment, a blade grip bearing 162 is positioned radially between the blade grip 160 and the hub housing 154 to which the blade grip 160 is attached to permit relative rotation about the blade axis 185 between the blade grip 160 and the hub housing 154. As will be described further herein, actuator assemblies 200A, 200B are configured to selectively control the angular position of each rotor blade 180 (relative the rotor blade 180's respective blade axis 185) and the hub assembly 152 to which the rotor blade 180 is coupled. In this embodiment, a blade grip fastener 164 couples each blade grip 160 to the hub housing 154 to which the blade grip 160 is attached.

Figure 9:
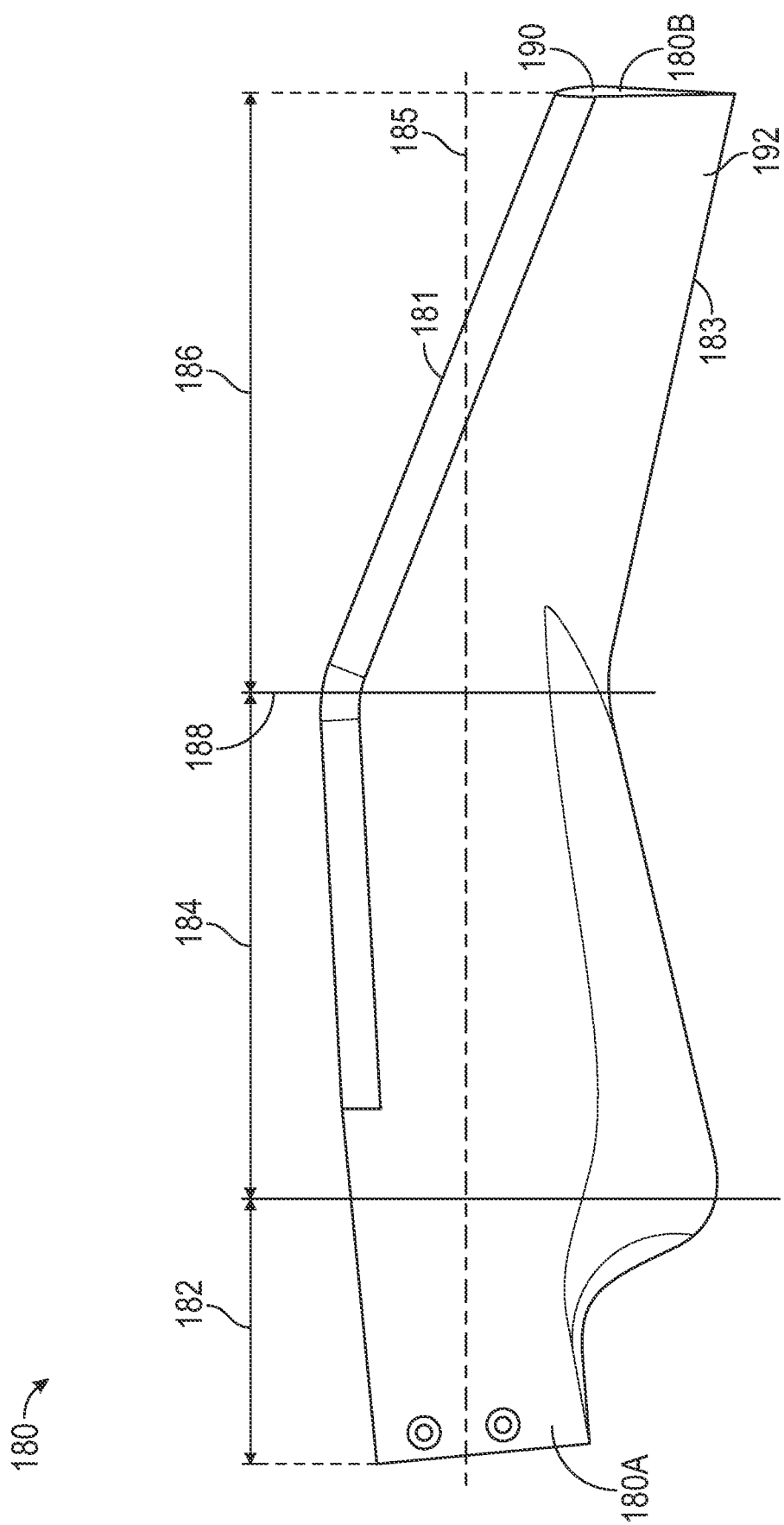
FIG. 9 is a top view of an embodiment of a rotor blade of the air vehicle of FIG. 1 in accordance with principles disclosed herein.

As shown particularly in FIG. 9, each rotor blade 180 of each rotor assembly 150A, 150B has a first or radially inner end 180A, a second or radially outer end 180B opposite inner end 180A, a leading edge 181 extending between ends 180A, 180B, and a trailing edge 183 extending between ends 180A, 180B. Each rotor blade 180 includes a blade root 182 positioned at inner end 180A and configured to couple to one of the blade grips 160 via one or more fasteners 166 (shown in FIG. 10). Additionally, the leading edge 181 of each rotor blade 180 includes a forward swept section 184 extending from the blade root 182, and a rearward swept section 186 extending from the forward swept section 184 to the radially outer end 180B of the rotor blade 180. In some embodiments, the forward swept section 184 extends from the radially inner end 180A of the rotor blade 180 to the location of sweep reversal 188, and the rearward swept section 186 extends from the location of sweep reversal 188 to the radially outer end 180B of the rotor blade 180. In this embodiment, blades 180 of air vehicle 10 have a tip Mach number of approximately 0.25-0.28; however, in other embodiments, the tip Mach number of each blade 180 may vary.

A sweep reversal 188 occurs at the interface between the forward swept section 184 and the rearward swept section 186. Sweep reversal 188 of each rotor blade 180 is configured to de-phase the interaction between the rotor blades 180 of each rotor assembly 150A, 150B, thereby reducing the noise produced by rotor assemblies 150A, 150B during operation. Particularly, given that lower rotor assembly 150 rotates in the opposite rotational direction as upper rotor assembly 150, the leading edge 181 of each rotor blade 180 of the upper rotor assembly 150A is positioned opposite (i.e., "flipped" in a top-down view) relative the leading edge 181 of each rotor blade 180 of the lower rotor assembly 150B. Thus, if the central axis 185 of a given rotor blade 180 of the upper rotor assembly 150 is angularly aligned with the central axis 185 of a given rotor blade 180 of the lower rotor assembly 150B, the forward swept section 184 of the blade 180 of upper rotor assembly 150A will extend at an angle relative to the forward swept section 184 of the blade 180 of the lower rotor assembly 150B. Additionally, the rearward swept section 186 of the blade 180 of the upper rotor assembly 150A will also extend at an angle relative to the blade 180 of the lower rotor assembly 150B. Therefore, even when the central axes 185 of the rotor blades 180 of the upper and lower rotor assemblies 150A, 150B are angularly aligned, the blade 180 of upper rotor assembly 150 will not entirely align or overlap the blade 180 of lower rotor assembly 150 from a top-down view. Instead, the blade 180 of upper rotor assembly 150A will be angularly spaced from the blade 180 of lower rotor assembly 150B at the location of sweep reversal 188.

Given that the rotating rotor blades 180 of upper rotor assembly 150A do cannot entirely overlap the contra-rotating rotor blades 180 of lower rotor assembly 150B, the aerodynamic interactions between the rotor blades 180 of upper rotor assembly 150A and the rotor blades 180 of lower rotor assembly 150B are spread across a range of circumferential locations. In this manner, the acoustic waves produced by the aerodynamic interactions arrive at positions in the acoustic far field at different points in time, thereby reducing the amplitude of the waves produced by the aerodynamic interactions and minimizing the noise generated by the contra-rotation of rotor assemblies 150A, 150B. In this embodiment, the forward swept section 184 of each rotor blade 180 extends along a longitudinal axis which is offset from the central axis 185 of the rotor blade 180 in a first angular direction while the rearward swept section 186 of each rotor blade 180 extends along a longitudinal or central axis which is offset from central axis 185 in a second angular direction opposite the first angular direction. Particularly, the central axis of the forward swept section 184 of each wing 180 is angled towards or in the angular direction of travel of the blade 180 while the central axis of the rearward swept section 186 of each wing 180 is angled away from the angular direction of travel of blade 180 when blade 180 rotates about central axis 15.

In this embodiment, the forward swept section 184 of each blade 180 is angled approximately 3-7 degrees in the first angular direction and the rearward swept section 186 is angled approximately 18-22 degrees in the second angular direction; however, in other embodiments, the degree of sweep in the forward and rearward swept sections 184, 186, respectively, of each blade 180 may vary. In an embodiment, the rotor blades 180 of each rotor assembly 150A, 150B define a disk radius ($R_D$) (indicated in FIG. 3 by line 187) of 4.2 feet (providing a maximum outer diameter for each rotor assembly 150A, 150B of approximately 8.5 feet), the vertical distance between rotor assemblies 150A, 150B is approximately 25% of the disk radius $R_D$, the location of sweep reversal 188 is positioned at 0.62*$R_D$, each rotor blade 180 has a root cutout that extends 0.35$R_D$, a chord length of 0.95 ft, and a twist of approximately −9 degrees; however, in other embodiments, the geometry of rotor assemblies 150A, 150B and each rotor blade 180 may vary. Additionally, in this embodiment, each blade comprises a NASA RC(4)-10 airfoil to provide a high lift coefficient for minimizing the required tip speed of blades 180 for generating sufficient thrust and to provide a low pitching moment to reduce control loads; however, in other embodiments, the airfoil of each rotor blade 180 may vary. In some embodiments, rather than having a discrete location of sweep reversal 188, rotor blades 180 may each have a continuous forward and backward sweep (e.g., a C-shaped sweep).

Compared to other hover-capable, rotary vehicles (e.g., quad-copters, etc.), rotor assemblies 150A, 150B are configured to maximize the size of disk area $A_D$ (the area swept by the rotating rotor blades 180 of each rotor assembly 150A, 150B) of each rotor assembly 150A, 150B $R_D$ of each assembly 150A, 150B relative to the maximum width or diameter of air vehicle 10 to thereby minimize the number of required rotor assemblies 150A, 150B and the required RPM of each rotor assembly 150A, 150B for both hover and forward flight. Particularly, given that rotor blades 180 rotate about the central axis 15, the disk area $A_D$ of each rotor assembly 150A, 150B is defined by the annular area extending between the radially outer ends 180A and radially inner ends 180B of rotor blades 180. For example, a quad-copter having a disk radius $R_D$ equal to the disk radius $R_D$ of each rotor assembly 150A, 150B would have a disk area $A_D$ that is approximately 4.3 times less than the disk area provided by rotor assemblies 150A, 150B.

Rotor assemblies 150A, 150B, each having a relatively large disk area $A_D$ compared to at least some conventional designs, maximizes the thrust produced by each rotor assembly 150A, 150B at a given RPM. Minimizing the required RPM of each rotor assembly 150A, 150B in-turn increases the energy efficiency of air vehicle 10 while also minimizing the noise produced by air vehicle 10 during operation.

Additionally, in this embodiment, each rotor blade 180 comprises a foam core 190 surrounded by a plurality of carbon fiber layers or plies 192. In some embodiments, the leading edge 181 and/or trailing edge 183 of each rotor blade 180 is reinforced with a unidirectional carbon fiber ply. In certain embodiments, the number of carbon fiber plies 192 of each rotor blade 180 reduces in number moving from the radially inner end 180A to the radially outer end 180B to maximize the strength-to-weight ratio of each rotor blade 180. In some embodiments, the root 182 of each rotor blade 180 includes glass fiber reinforcement. In certain embodiments, the surface of each rotor blade 180 is sanded or otherwise worked on to provide a smooth of surface as possible for reducing broadband noise during the operation of air vehicle 10 However, the method and materials used for manufacturing each rotor blade 180 of air vehicle 10 may vary.

Each rotor blade 180 is rotatable about its central axis 185 in response to the operation of actuator assemblies 200A, 200B in order to control the flight of air vehicle 10. Particularly, the first actuation assembly 200A is configured to selectably rotate and control the angular position of each rotor blade 180 of upper rotor assembly 150A about its respective central axis 185 while the second actuation assembly 200B is configured to selectably rotate and control the angular position of each rotor blade 180 of lower rotor assembly 150B. Additionally, each actuation assembly 200A, 200B is electrically and independently controlled by avionics system 300, and thus, there is no direct mechanical linkage between actuator assemblies 200A, 200B, reducing the weight and mechanical complexity of air vehicle 10.

Figure 10:
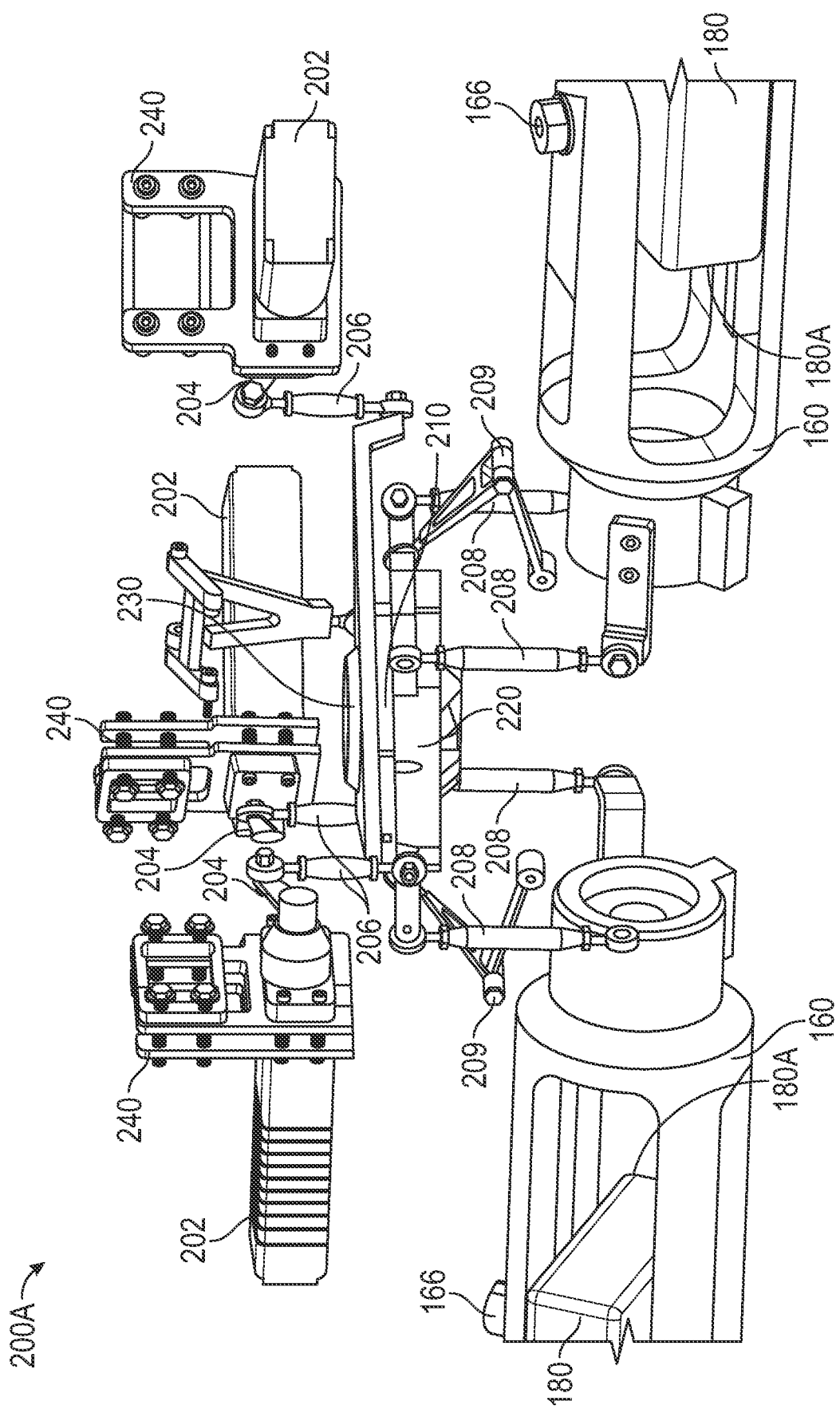
FIG. 10 is a perspective view of an embodiment of an actuator assembly of the air vehicle of FIG. 1 in accordance with principles disclosed herein.

As shown particularly in FIG. 10, in this embodiment, each actuation assembly 200A, 200B generally includes a plurality of actuators or servos 202, swashplate assembly including a nonrotating swashplate 210 and a rotating swashplate 220, and a spherical bearing 230. Swashplates 210, 220, and spherical bearing 230 are each positioned about or surround the strut 14 of support structure 12 and are aligned with central axis 15 of air vehicle 10. Strut 14 is rotationally locked or stationary relative to the other components of support structure 12 (e.g., cockpit support frame 30, etc.). Unlike a conventional swashplate assembly, in this embodiment, the nonrotating swashplate 210 comprises an inner swashplate 210 that is positioned radially within the outer, rotating swashplate 220. Additionally, spherical bearing 230 is positioned radially between the nonrotating swashplate 210 and strut 14 of support structure 12. In this embodiment, each actuation assembly 200A, 200B includes a first jointed scissor link 209 coupled between the nonrotating swashplate 210 and the support structure 12 of air vehicle 10, and a second jointed scissor link 209 coupled between the rotating swashplate 220 and the hub assembly 152. Scissor links 209 are configured to permit relative movement along central axis 15 between strut 14 and the swashplates 210, 220. Additionally, scissor links 209 restrict relative rotation between strut 14 and the nonrotating swashplate 210 while permitting the shared central axis of swashplates 210, 220 to deflect from central axis 15.

In addition, each actuation assembly 200A, 200B comprises a plurality of actuator or servo mounts 240 that couple servos 202 to the support structure 12 of air vehicle 10. Particularly, the servo mounts 240 of first actuation assembly 200A couple servos 202 of assembly 200A to the upper support arm 18 of support structure while the servo mounts 240 of second actuation assembly 200B couple the servos 202 of assembly 200B to the lower support arm 22 of support structure 12. In this embodiment, servos 202 of each actuation assembly 200A, 200B comprise a rotational actuator including a rotatable output shaft 204; however, in other embodiments, servos 202 of each actuation assembly 200A, 200B may comprise linear actuators. The output shaft 204 of each servo 202 is pivotably connected to a first or servo control link 206 that is pivotably connected to the inner swashplate 210. In this configuration, servos 202 may be actuated to rotate inner swashplate 210 about multiple independent axes relative central axis 15 via the spherical bearing 230.

Swashplates 210, 220 of each actuation assembly 200A, 200B include a shared or single central or longitudinal axis, where rotating swashplate 220 is permitted to rotate relative to nonrotating swashplate 210 about the shared central axis of swashplates 210, 220. Additionally, movement of nonrotating swashplate 210 may be transferred to the rotating swashplate 220, which is not permitted to pivot relative to nonrotating swashplate 210 except about the shared central axis of swashplates 210, 220. In this embodiment, a pair of second or blade pitch links 208 are pivotably connected to each blade grip 160. Additionally, each blade pitch link 208 is pivotably connected to rotating swashplate 220 such that motion of rotating swashplate 220 may be transmitted to each rotor blade 180. In this configuration, actuation of servos 240 produces motion in control links 206 which is translated into rotation of one or more rotor blades 180 about their respective central axes 185 via the operation of swashplates 210, 220.

In this embodiment, avionics system 300 of air vehicle 10 generally includes pilot instrumentation for day and night flying, a datalogger black box, high-definition cameras, thermocouples for monitoring the temperature of motors 120A, 120B, an ultra-high frequency (UHF) antenna, and a global positioning system (GPS) transponder; however, in other embodiments, the configuration of avionics system 300 may vary. Additionally, avionics system 300 includes a control system 302 that assists with stabilizing and controlling air vehicle 10 in both hover and forward flight. Additionally, control system 302 transmits commands inputted from the pilot via controls interface 33 into electrical signals for controlling the operation of motors 120A, 120B of powertrain 100 and the servos 202 of actuator assemblies 200A, 200B. In this embodiment, the control system 302 of air vehicle 10 comprises a "fly-by-wire" control system with no mechanical linkage between controls interface 33 and rotor assemblies 150A, 150B. Additionally, in this embodiment, no mechanical linkage is provided between actuator assemblies 200A, 200B, and instead, each actuation assembly 200A, 200B is independently controlled by control system 302.

In this embodiment, control system 302 generally includes a controller or autopilot 304 positioned on the electronics support frame 31 of support structure 12. In some embodiments, controller 304 comprises microprocessor or microcontroller unit, a memory, a three-axis gyroscope, an accelerometer, a magnetometer, and voltage, temperature, and pressure (static and dynamic) sensors; however, in other embodiments, the configuration of controller 304 may vary. Control system 302 also includes signal pathways or cables 305 (shown schematically in FIG. 4) placing controller 304 in signal communication with motor controller 108 and the servos 202 of actuator assemblies 200A, 200B. In this embodiment, cables 305 of control system 302 extending between controller 304 and components of air vehicle 10 (e.g., servos 202, etc.) pass through a central passage 13 of the strut 14 of support structure 12; however, in other embodiments, signals may be transmitted between the controller 304 and other components of air vehicle 10 via other mechanisms.

In this embodiment, controller 304 includes a hovering flight mode and a forward flight mode for controlling the RPM of each motor 120A, 120B. Particularly, in this embodiment, when in the hovering flight mode, controller 304 is configured to operate motors 120A, 120B at a substantially fixed rotational rate of approximately 680-720 RPM and operate actuator assemblies 200A, 200B position rotor blades 180 at a high pitch angle to minimize noise given that air vehicle 10 may be positioned on or close to the ground during the hovering flight mode. Additionally, in this embodiment, when in the forward flight mode, controller 304 is configured to operate motors 120A, 120B at a substantially fixed rotational rate of approximately 930-970 RPM to increase the stall margin of rotor blades 180. In other embodiments, the RPM of motors 120A, 120B in the hovering flight mode and/or the forward flight mode may vary. Controller 304 is configured to switch from hovering flight mode to the forward flight mode once air vehicle 10 reaches a desired, preset altitude.

Figure 11:
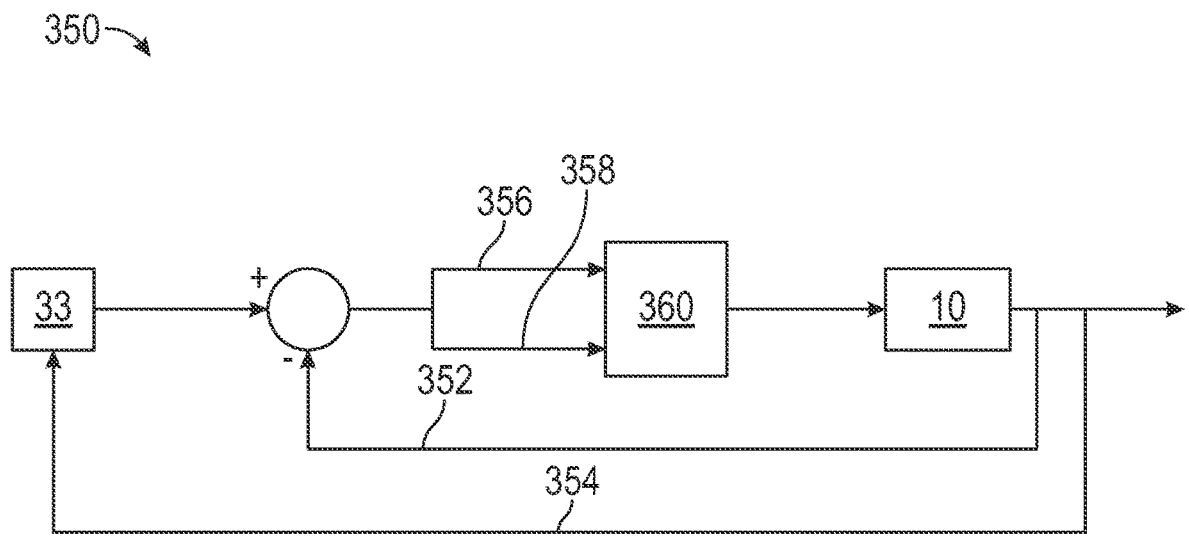
FIG. 11 is a flowchart of an embodiment of a feedback control mechanism of the air vehicle of FIG. 1 in accordance with principles disclosed herein.

Referring to FIGS. 1-11, an embodiment of a feedback control mechanism 350 executed by the control system 302 of air vehicle 10 is shown in FIG. 11. In the embodiment of FIGS. 1-11, inner loop feedback 352 corresponding to the body states (e.g., body states p, q, r, φ, and θ) of air vehicle 10 is provided by controller 304 while outer loop feedback 354 corresponding to the inertial states (e.g., inertial states x, y, z) of air vehicle 10 is provided by the pilot of air vehicle 10 via controls interface 33. In this embodiment, the outer loop feedback 354 provided by the pilot includes heave, roll, pitch, and yaw of air vehicle 10. Electronic control mixing provided by controller 304 provides a first plurality of control signals 356 corresponding to the servos of the first actuation assembly 200A, and a second plurality of control signals 358, separate and distinct from the first plurality of control signals 356, corresponding to the servos 202 of the second actuation assembly 200B. In this embodiment, the first plurality of control signals 356 comprise a desired or setpoint blade angle for each blade 180 (relative the blade's central axis 185) of the first rotor assembly 150A, while the second plurality of control signals 358 comprise a desired or setpoint blade angle for each blade 180 of the second rotor assembly 150B.

In this embodiment, the first and second plurality of control signals 356, 358, respectively, are processed by a proportional-derivative (PD) controller 360 of feedback control mechanism 350. Following processing by PD controller 360, first and second plurality of control signals 356, 358 are provided to the servos of the first actuation assembly 200A and second actuation assembly 200B, respectively. In other embodiments, the features of feedback control mechanism 350 of control system 302 may vary. For example, in some embodiments, air vehicle 10 may fly autonomously without input from a pilot, eliminating the outer loop feedback 354 provided by the pilot via controls interface 33. Additionally, in some embodiments, a controller other than PD controller 360 may be used, such as a proportional-integral-derivative (PID) controller or other model-based controllers.

While embodiments of the disclosure have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A hover-capable aircraft, comprising:
a body;
a first rotor assembly rotatably coupled to the body, wherein the first rotor assembly includes a first plurality of circumferentially-spaced blades and is configured to rotate about a rotational axis in a first rotational direction; and
a second rotor assembly rotatably coupled to the body, wherein the second rotor assembly includes a second plurality of circumferentially-spaced blades and is configured to rotate about the rotational axis in a second rotational direction opposite the first rotational direction;
wherein each blade of at least one of the first plurality of blades and the second plurality of blades comprises a root, a forward swept section extending directly from the root, and a rearward swept section.

2. The aircraft of claim 1, wherein:
each blade of the first plurality of blades and the second plurality of blades comprises a location of sweep reversal positioned between the forward swept section and the rearward swept section; and
the forward swept section of each blade of the first plurality of blades and the second plurality of blades has a greater length than the rearward swept section.

3. The aircraft of claim 1, wherein the forward swept section of each blade of the first plurality of blades and the second plurality of blades has a central axis that is angled from 3 degrees to 7 degrees from a central axis of the blade in a first angular direction, and the rearward swept section of each blade of the first plurality of blades and the second plurality of blades has a central axis that is angled from 18 degrees to 22 degrees from the central axis of the blade in a second angular direction opposite the first angular direction.

4. The aircraft of claim 1, further comprising a first actuation assembly comprising a first plurality of electronically controlled actuators coupled to an inner swashplate positioned in an outer swashplate, and wherein the first plurality of actuators are configured to control the movement of the inner swashplate relative to the body.

5. The aircraft of claim 4, wherein:
the inner swashplate and the outer swashplate are coupled to a cylindrical strut of the body;
the outer swashplate comprises a rotating swashplate that is rotationally locked to the first plurality of blades; and
the inner swashplate comprises a nonrotating swashplate configured to rotate relative to the outer swashplate about a central axis of the strut.

6. The aircraft of claim 5, further comprising a spherical bearing positioned radially between the inner swashplate and the strut.

7. The aircraft of claim 4, further comprising a control system coupled to the body and configured to independently control the first plurality of actuators.

8. A hover-capable aircraft, comprising:
a body;
a first rotor assembly positioned along a rotational axis and rotatably coupled to the body, wherein the first rotor assembly includes a first plurality of circumferentially-spaced blades and is configured to rotate about the rotational axis; and
a second rotor assembly positioned along the rotational axis at a position spaced from the first rotor assembly and rotatably coupled to the body, wherein the second rotor assembly includes a second plurality of circumferentially-spaced blades and is configured to rotate about the rotational axis;
wherein each blade of at least one of the first plurality of blades and the second plurality of blades comprises a root extending between a radially inner end defining a radially inner end of the blade and a radially outer end, a forward swept section having a radially inner end located directly adjacent the radially outer end of the root, and a rearward swept section.

9. The aircraft of claim 8, wherein the root of has a root cutout.

10. The aircraft of claim 8, wherein:
each blade of the first plurality of blades and the second plurality of blades comprises a location of sweep reversal positioned between the forward swept section and the rearward swept section; and
the forward swept section of each blade of the first plurality of blades and the second plurality of blades has a greater length than the rearward swept section.

11. The aircraft of claim 8, wherein the forward swept section of each blade of the first plurality of blades and the second plurality of blades has a central axis that is angled from 3 degrees to 7 degrees from a central axis of the blade in a first angular direction, and the rearward swept section of each blade of the first plurality of blades and the second plurality of blades has a central axis that is angled from 18 degrees to 22 degrees from the central axis of the blade in a second angular direction opposite the first angular direction.

12. A hover-capable aircraft, comprising:
a body;
a first rotor assembly rotatably coupled to the body, wherein the first rotor assembly includes a first plurality of circumferentially-spaced blades and is configured to rotate about a rotational axis in a first rotational direction; and
a second rotor assembly rotatably coupled to the body, wherein the second rotor assembly includes a second plurality of circumferentially-spaced blades and is configured to rotate about the rotational axis in a second rotational direction opposite the first rotational direction;
wherein each blade of at least one of the first plurality of blades and the second plurality of blades comprises a forward swept section directly extending from a radially inner end of the blade, and a rearward swept section.

13. The aircraft of claim 12, wherein the forward swept section extends from the radially inner end of the blade to a location of sweep reversal between the forward swept section and the rearward swept section.

14. The aircraft of claim 13, wherein the rearward swept section extends from the location of sweep reversal to a radially outer end of the blade.

15. The aircraft of claim 13, wherein the rearward swept section extends from a location of sweep reversal between the forward swept section and the rearward swept section.

16. The aircraft of claim 12, wherein:
   each blade of the first plurality of blades and the second plurality of blades comprises a location of sweep reversal positioned between the forward swept section and the rearward swept section; and
   the forward swept section of each blade of the first plurality of blades and the second plurality of blades has a greater length than the rearward swept section.

17. The aircraft of claim 12, wherein the forward swept section of each blade of the first plurality of blades and the second plurality of blades has a central axis that is angled from 3 degrees to 7 degrees from a central axis of the blade in a first angular direction, and the rearward swept section of each blade of the first plurality of blades and the second plurality of blades has a central axis that is angled from 18 degrees to 22 degrees from the central axis of the blade in a second angular direction opposite the first angular direction.

\* \* \* \* \*